(12) United States Patent
Wolff et al.

(10) Patent No.: US 7,017,757 B2
(45) Date of Patent: Mar. 28, 2006

(54) MECHANICALLY STABLE, POROUS SHAPED ACTIVATED CARBON ARTICLE AND FILTERING SYSTEM

(75) Inventors: Thomas Wolff, Münchberg (DE); Georg Vieweger, Salem (DE); Mario Schoen, Gefrees (DE)

(73) Assignee: helsa-automotive GmbH & Co. KG, Gefrees (DE)

( * ) Notice: Subject to any disclaimer, the term of this patent is extended or adjusted under 35 U.S.C. 154(b) by 0 days.

(21) Appl. No.: 10/393,746

(22) Filed: Mar. 21, 2003

(65) Prior Publication Data

US 2003/0178357 A1 Sep. 25, 2003

(30) Foreign Application Priority Data

Mar. 22, 2002 (DE) .................................. 102 13 016

(51) Int. Cl.
*B01D 39/20* (2006.01)
(52) U.S. Cl. ..................... 210/483; 55/523; 55/524; 96/153; 210/502.1; 210/504; 210/505; 210/506; 210/510.1; 428/408; 502/413; 502/527.24
(58) Field of Classification Search ................ 210/263, 210/502.1, 504, 506, 510.1, 483, 505; 428/408; 502/413, 527.24; 55/523, 524; 96/153
See application file for complete search history.

(56) References Cited

U.S. PATENT DOCUMENTS

| 4,518,704 A | 5/1985 | Okabayashi et al. ........... 502/80 |
| 5,488,021 A | 1/1996 | DeLiso et al. ................ 502/63 |
| 5,750,026 A * | 5/1998 | Gadkaree et al. ......... 210/502.1 |
| 6,171,373 B1 | 1/2001 | Park et al. ..................... 95/138 |
| 6,699,561 B1 * | 3/2004 | Wolff .......................... 428/116 |

FOREIGN PATENT DOCUMENTS

| DE | 37 81 419 | 4/1993 |
| DE | 101 04 882 | 8/2002 |
| EP | 0 492 081 | 7/1992 |
| EP | 0 645 346 | 3/1995 |
| WO | WO-00/69555 | 11/2000 |

* cited by examiner

*Primary Examiner*—Ivars C. Cintins
(74) *Attorney, Agent, or Firm*—Fulbright & Jaworski LLP; Jan K. Simpson

(57) ABSTRACT

The invention relates to a mechanically stable, porous shaped activated carbon article having a first three-dimensional framework structure based on carbonized resin, a second three-dimensional inorganic framework structure comprising ceramic material and/or baked refractory material, and binding agent, as well as activated carbon particles, in which the first and second framework structures penetrate each other at least partially and the activated carbon particles are fixed to the framework structures. The invention also relates to a process for the production of such a shaped activated carbon article and to the use thereof.

36 Claims, 4 Drawing Sheets

MECHANICALLY STABLE, POROUS SHAPED ACTIVATED CARBON ARTICLE AND FILTERING SYSTEM

CROSS-REFERENCE TO RELATED APPLICATIONS

This application claims the benefit of the filing date of German Patent Application No. 102 13 016.7 filed on Mar. 22, 2002 pursuant to 35 U.S.C. 119 and the Paris Convention.

BACKGROUND AND SUMMARY OF THE INVENTION

The invention relates to a mechanically stable, porous shaped activated carbon article, to a process for the production thereof, and to the use thereof.

U.S. Pat. No. 4,518,704 discloses a porous, baked, and activated shaped carbon article having a honeycomb structure of activated carbon and a support material of clay. To produce the shaped article, a mixture of activated carbon granules is mixed with clay, the mixture is extruded to form a shaped article having a honeycomb structure, and the resulting shaped article is dried and finally baked in a non-oxidizing atmosphere.

U.S. Pat. No. 5,488,021 discloses a shaped article having a honeycomb structure and comprising activated carbon particles, attapulgus clay, and an organic binding agent.

EP 0,645,346 A1 discloses a shaped activated carbon article in which the activated carbon is held together by a phenolic resin binder. This is achieved by first of all forming an aqueous mixture of activated carbon and phenolic resin and then adding an organic binding agent, extruding the mixture to form a shaped article having a honeycomb structure, followed by drying.

WO 00/69555 discloses a honeycombed adsorbent monolith produced from activated carbon, a ceramic-forming material, fluxing agent, and water.

U.S. Pat. No. 6,171,373 B1 likewise discloses an adsorbent monolith consisting of activated carbon and ceramic-forming material.

A characteristic of activated carbon is that it tends to become very brittle and is subject to strong attrition. Furthermore, a great drawback of activated carbon is that it binds only weakly to ceramic skeletons. For this reason, the content of activated carbon in the prior shaped activated carbon articles comprising ceramics and activated carbon is limited with regard to the mechanical strength of the shaped activated carbon article. The honeycombed shaped activated carbon articles thus produced are subject to strong attrition. The mechanical stability of such shaped activated carbon articles depends entirely on the stability of the ceramic framework. The usefulness of such shaped activated carbon articles is very restricted, particularly in filtering systems.

Since phenolic resin has the property of sealing the pores of the activated carbon particles, care must be taken during production of a shaped activated carbon article of activated carbon and phenolic resin to ensure that the content of phenolic resin relative to the amount of activated carbon is low, in order that only a small proportion of the pores of the activated carbon become sealed.

A disadvantage resulting herefrom is that the mechanical stability of shaped activated carbon articles having a low content of phenolic resin is very low. Raising the content of phenolic resin causes the pores of the activated carbon particles to be sealed and, consequently, the adsorptability of such shaped activated carbon articles is very weak.

Hitherto known honeycombed shaped activated carbon articles exhibit either low mechanical stability accompanied by an increased sorptability, or increased mechanical stability accompanied by a reduced sorptability.

Such honeycombed shaped activated carbon articles are used, inter alia, in motor vehicles in filtration systems for filtering the air in the passenger compartment. Due to the fact that the construction of motor vehicles is becoming more and more complex, there is decreasingly less room for such an air filtration system in motor vehicles. Therefore it is necessary that such honeycombed shaped activated carbon articles exhibit, due to confinement of space, increased mechanical stability combined with high sorptability.

It is an object of the invention to provide a shaped activated carbon article exhibiting high mechanical stability and high sorptability.

It is another object of the invention to increase the sorptability of shaped activated carbon articles relatively to hitherto known activated carbon systems whilst maintaining or improving the mechanical stability thereof, so as to make it possible to reduce the total volume of filtering systems.

The basic object of the invention is achieved by the provision of a mechanically stable, porous shaped activated carbon article, wherein the shaped activated carbon article exhibits a first three-dimensional framework structure based on carbonized resin, a second three-dimensional inorganic framework structure comprising ceramic material and/or baked refractory material, and binding agent, and also activated carbon particles, in which the first and second framework structures penetrate each other at least partially and the activated carbon particles are fixed in position.

Preferably, the first and second framework structures penetrate each other substantially completely. A further preference is that the activated carbon particles are substantially all fixed to the first framework structure.

Consequently, the present invention provides a monolithic structure, in which activated carbon or activated carbon particles are enclosed in an arrangement of two framework structures. The first framework is formed by carbonization of resinous material and the second framework is a ceramic framework comprising bonded ceramic material and/or a refractory material.

The first three-dimensional framework structure resulting from the carbonization of resin preferably binds the activated carbon or activated carbon particles. The activated carbon or the activated carbon particles are partially embedded in the porous carbon framework produced by carbonization of the resin or are fixed thereto, with the result that an abrasion-resistant, mechanically stable structure having very good sorption properties is formed. A porous carbon produced by carbonization of resin is also known as glass-like carbon.

The first three-dimensional framework structure produced by carbonization of resin, i.e. the porous carbon structure, reliably binds activated carbon particles in an extremely advantageous fashion. The second three-dimensional framework structure of ceramic material and/or baked refractory material and binding agent is extremely stable and has excellent impact resistance properties.

The two framework structures are consequently present side-by-side and penetrate each other, preferably completely. The high stability of the porous shaped activated carbon article of the invention is the result of the three-dimensional intermeshing of the two skeletons. Preferably, the production of the shaped activated carbon article of the invention starts from a resin having aromatic nuclei. It has been found that when pyrolysis is carried out on resins having aromatic nuclei a porous carbon structure is formed which is particularly suitable for the present purpose. This carbon structure reliably fixes the activated carbon particles and allows, by reason of its porous structure, the material to be adsorbed to access the activated carbon particles. Furthermore, the carbon structure produced in such a manner seems itself to possess a certain sorptability.

Preferably, the first framework structure is substantially prepared from carbonized synthetic resin, preferably phenolic resin, furan resin, epoxy resin, unsaturated polyester resin or a mixture thereof.

Very particular preference is given to the use of phenolic resins, for example novolak.

It has been found that excellent incorporation or fixation of activated carbon particles in the first three-dimensional framework structure produced by carbonization of resin, preferably synthetic resin, is effected when the ratio, by weight, of resin to activated carbon is, prior to carbonization, approximately 1:1 to approximately 6:1, preferably approximately 2:1 to approximately 4:1, in which case the porous shaped activated carbon articles of the invention which result from the two framework structures possesses excellent overall mechanical stability combined with distinctly improved sorptability Very satisfactory results are obtained with a ratio, by weight, of resin to activated carbon of 3:1.

It has been generally found that the amount of resin used in the production of the mechanically stable, porous shaped activated carbon article of the invention must be so much larger than the content of activated carbon or activated carbon particles to ensure that the activated carbon particles are reliably embedded in the first three-dimensional carbon framework structure produced by the carbonization of resin, preferably synthetic resin.

Furthermore, it is preferred that the second framework structure contains not only ceramic material and baked refractory material but also a silicate binder.

The use of ceramics and/or baked refractory material instead of the clay, as conventionally employed in the prior art, during production of the shaped activated carbon article of the invention reduces the water content of the total mixture and thus leads to a reduction in shrinkage on drying. Preferably the ceramic material and/or baked refractory material used is chamotte.

Furthermore, it is preferred that the second framework structure contains, as additional component, a fluxing agent capable of lowering the sintering temperature of the refractory components of the inorganic framework structure.

Preferably, the fluxing agent used is Na2O in an amount of up to approximately 1 wt %, more preferably from approximately 0.3 to approximately 1 wt %, and most preferably in an amount of from 0.5 to approximately 1 wt %, based on the total weight of the ceramic material and/or baked refractory material.

The addition of Na2O has, particularly when use is made of colloidal silica sol or water glass together with chamotte, the effect of reducing the sintering temperature for the silicate lattice and also of increasing the stability of the ceramic framework. When the portion of Na2O is raised to more than approximately 1 wt %, the stability of the ceramic framework may deteriorate.

Preferably, the ratio, by weight, of ceramic material and/or refractory material to the binding agent ranges from approximately 2:1 to 1:2. When use is made of chamotte as ceramic material and silica sol as binding agent, it has been found that the ratio, by weight, of chamotte to silica sol should be at least 2:1. Excellent results are obtained when the ratio, by weight, of chamotte to silica sol is 1:1. As regards the stability of the sintered or baked second three-dimensional framework, the SiO2 content of the silica sol should be at least 30%.

It is also preferred that the porous shaped activated carbon articles of the invention contain, in the first and/or second framework structure, stabilizing fiber, preferably glass fibers and/or carbon fibers.

Particular preference is given to an embodiment in which the shaped activated carbon article has a honeycomb structure. Such honeycomb structures, for example, in the form of a classical honeycomb, have proven to be extremely advantageous when the shaped activated carbon article of the invention is used in filtering systems.

The object of the invention is also achieved by a filtering system which contains a shaped activated carbon article that exhibits a first three-dimensional framework structure based on carbonized resin, a second three-dimensional inorganic framework structure comprising ceramic material and/or baked refractory material and also binding agent and activated carbon particles in which the first and second framework structures penetrate each other at least partially and the activated carbon particles are fixed in position.

The object of the invention is also achieved by a process for the production of a mechanically stable, porous shaped activated carbon article, which has the following process steps:

(a) mixing of activated carbon particles, resin, and binding agent with ceramic material and/or baked refractory material with the addition of a liquid phase to prepare an extrudable composition, (b) extruding the composition formed in step (a) to a monolithic shaped article, (c) drying the shaped article extruded in step (b), (d) heating the shaped article dried in step (c) to a temperature above the melting temperature of the resin and keeping it at this temperature for a period of time, (e) pyrolyzing the product resulting on conclusion of step (d), and (f) sintering the pyrolyzate resulting on conclusion of step (e).

The liquid phase added in step (a) is preferably water. The amount of added water determines the viscosity of the mixture. The viscosity is suitably adjusted so that the mixture or composition can be extruded to form a monolithic shaped article.

It is, of course, possible to add other auxiliaries in step (a). For example, wax can be added to the mixture in order to provide good slip between the individual particles, ie, to improve the so-called internal slip. Such improved internal slip facilitates homogeneous distribution of the individual components during extrusion of the composition through the die of the extruder. Furthermore, an increase in internal slip can have the extremely advantageous effect of avoiding local damming in individual channels of the die during extrusion.

In addition, surfactant or soap can be added to the composition in step (a), in order to improve sliding of the composition in the extruder or the mold. A comparable effect can be obtained when 10–50 wt % of the content of surfactant or soap is replaced by graphite powder.

In order to improve the strength of the green molding obtained on conclusion of extrusion it is preferable to add liquid starch in step (a). Following drying of the extruded monolithic shaped article the starch that is added produces a stable framework which increases the stability of the green molding.

According to a preferred embodiment of the process of the invention, a green molding binder is added to the mixture in step (a). Preferably, the green molding binder added is cellulose ether or a cellulose ether derivative, preferably methylhydroxypropyl cellulose. In the mixture provided in step (a), the cellulose ether binds the water surrounding the activated carbon and contributes to stabilization of the green molding. Furthermore, the green molding binder promotes homogenization of the mixture comprising activated carbon and ceramic material or refractory material and preferably synthetic resin by counteracting separation of the mixture as could occur by reason of the different component densities.

The cellulose ether used can be, for example, methyl cellulose, ethylhydroxyethyl cellulose, hydroxybutyl cellulose, hydroxybutylmethyl cellulose, hydroxyethyl cellulose, hydroxymethyl cellulose, hydroxypropyl cellulose, methylhydroxypropyl cellulose, hydroxyethylmethyl cellulose, sodium carboxymethyl cellulose, or a mixture thereof.

Preferably, the amount of green molding binder added, for example, cellulose ether, is not more than approx. 5 wt %, based on the total composition. Otherwise there is the risk of big defects occurring in the form of macro pores in the extruded monolithic shaped article when the article is sintered, as a result of the green molding binder being burnt out.

Preferably, when water is added for the purpose of adjusting the viscosity of the extruded composition obtained in step (a), up to 20% of the water is mixed with a portion of the cellulose ether. In this manner excessive adsorption of the water in or on the activated carbon can be advantageously avoided.

Following extrusion of the composition obtained in step (a) to form a monolithic shaped article, the latter is preferably cut to length and then dried. Drying is preferably carried out in a forced air oven at approximately 50° C. to approximately 80° C. Of course, other drying process, such as microwave techniques, may be used, if desired.

It has been found that it is advantageous when the moisture is permanently and quickly removed in order to avoid tearing of the extruded shaped article during the drying process. The monolithic shaped article is preferably dried until the water content is 2.5 wt % or less.

In step (d), the shaped article dried in step (c) is heated to a temperature above the melting temperature of the preferably synthetic resin, to provide a precured green molding. During this heating stage, the preferably synthetic resin added in step (a) melts so as to cause the activated carbon particles to be embedded in the resulting melt. The resins used are preferably the aforementioned resins having aromatic nuclei and synthetic resins. Phenolic resins, furan resins, epoxy resins, unsaturated polyester resins, and mixtures thereof have been found to be very suitable. Particular preference is given to the use of novolak resins.

In heating stage (c) crosslinking and curing of the resinous material occurs during melting or in the melt. The final temperature used during this heating stage is preferably in a range of from approximately from 80° to 180° C. depending on the resin or resin formulation used. The residence time at this final temperature is preferably in the range of from approximately 60 minutes to approximately 180 minutes.

Preferably, the preferably synthetic resin is added in step (a) in powdered form. This has the extremely advantageously result that the pores of the activated carbon particle are not occupied or sealed by the resin as long as the resin is not molten. In order to cause incorporation of the activated carbon particles and thus adequate fixation of the activated carbon particles in the carbon framework structure later produced by carbonization of the preferably synthetic resin, the amount of resin used must be sufficiently large in relation to the quantity of activated carbon used.

It has been found that very satisfactory results are obtained when using a ratio, by weight, of resin to activated carbon in step (a) ranging from approximately 1:1 to approximately 6:1, preferably from approximately 2:1 to approximately 4:1. Very good results are obtained using a ratio, by weight, of resin to activated carbon in step (a) of approximately 3:1.

For the preferred use of a novolak resin as synthetic resin a ratio, by weight, of novolak resin to activated carbon of approximately 3:1 has proven to be very suitable.

During step (d), in which the preferably synthetic resin melts and crosslinks and the activated carbon particles become embedded in the molten resin, the inorganic framework of ceramic material and/or baked refractory material and binding agent stabilizes the structure of the extruded monolithic shaped article. Without any stabilization of the monolithic shaped article by the inorganic framework structure, the monolithic shaped articles would become instable in step (d) and become deformed.

In the pyrolysis step (e), the temperature is further increased until carbonization of the crosslinked and cured resinous material occurs. During carbonization of the crosslinked resinous material, a porous solid carbon structure forms, which is also referred to as glass-like carbon. The activated carbon particles are then fixed in position on this porous carbon framework. The pores of the activated carbon occupied by resinous material are again made available for adsorption purposes by the carbonization and the formation of a porous carbon framework. The pyrolysis or carbonization of the crosslinked and cured resin is preferably carried out at a final temperature which ranges from approximately 350° C. to approximately 550° C. and is more preferably approximately 450° C. The final temperature is preferably maintained for a period of from approximately 60 minutes to approximately 180 minutes.

The end of the pyrolysis of the resinous material can be monitored by watching the smoking pyrolyzate. When substantially no more new degradation products are formed, the pyrolysis or carbonization is complete.

In the sintering step (f) following pyrolysis step (e), the temperature is raised further until sintering of the ceramic materials or refractory materials occurs. The sintering operation is preferably carried out at a final temperature ranging from approximately 600° C. to approximately 1000° C., preferably from approximately from 650° to 800° C. The final temperature is preferably maintained for a period of from approximately 60 minutes to approximately 180 minutes. During this sintering step, the silicate lattice already formed during the drying process is additionally reinforced by eliquation of the refractory components.

On completion of the sintering operation the monolithic shaped article is cooled.

During pyrolysis or sintering, any added auxiliaries, such as wax, surfactant or soap, cellulose ether, and starch are naturally likewise carbonized or decomposed.

The carbon in the shaped carbon article can be activated by conventional methods. For example, activation of the carbon can be carried out at a temperature of from 700° to 950° C. in an activating atmosphere containing from 25 to 35 vol % of steam.

The sorption properties of the shaped activated carbon article obtained in the process of the invention can, of course, be additionally influenced by the properties of the activated carbon. The important parameters in this case are the pore size, pore-size distribution and the active surface area of the activated carbon used and also the particle size and particle-size distribution of the activated carbon. All types of activated carbon can be used in the present invention. Both a microporous coconut carbon having a content of micro pores of more than 95% and a surface area (BET) of 1200 m2/g and a mesoporous charcoal having a content of mesopores of more than 50% and a surface area (BET) of 2000 m2/g have been used. The former is preferably used for cabin air filtration for deodorization purposes, and the latter is preferably used for tank ventilation and solvent recovery. It is essential in both cases that the pore structure is retained in the finished shaped article.

Preferably, the synthetic resinous material used is a powdered novolak material which is a partially crosslinked phenolformaldehyde resin and has a melting point between approximately 80° and approximately 160° C., particularly between approximately 100° and 140° C.

For further stabilization of the strength properties of the shaped article stabilizing fibers can be incorporated in the mixture produced in step (a). Glass fibers and/or carbon fibers are preferably added.

The amount of stabilizing fibers added can range from 1 to 15 wt %, based on the total weight of the mixture produced in step (a). The melting point of the fibers that are added should in this case be above the maximum sintering temperature used to avoid fusion of the fibers during sintering. If glass powder or glass frit material is additionally added to the mixture in step (a), this provides additional cross-linkage between the glass fibers in the end product. Preferably glass fibers and sintered-glass material are added to the mixture produced in step (a) in an amount of approximately 10 wt %, based on the weight of activated carbon, to improve the mechanical stability of the end product.

When use is made of carbon fibers, such cross-linkage can be achieved via the carbon framework obtained following carbonization.

Preferably, a fluxing agent is added to the mixture produced in step (a) for lowering the sintering temperature of the ceramic material and/or refractory material. Preferably, Na2O is added in an amount of up to approximately 1 wt %, preferably from approximately 0.3 wt % to approximately 1 wt %, based on the total weight of the ceramic material and/or refractory material. Very preferably, the amount of Na2O added ranges from approximately 0.5–1 wt %, based on the total weight of the ceramic material and/or refractory material.

Preferably, pyrolysis in step (e) and sintering in step (f) are carried out in an inert gas atmosphere, preferably a nitrogen atmosphere.

In a preferred embodiment of the process of the invention, approximately 0.5 to approximately 1.5 vol % of oxygen is added to the inert gas atmosphere in the sintering step while holding the final temperature. It has been found that this measure enlarges the surface area and that consequently the adsorptability of the shaped article produced can be raised.

In this case the adsorptability of the shaped article is raised when the amount of added oxygen is increased to from 0.5 vol % to 1.5 vol %. Further raising of the amount of oxygen in the inert gas atmosphere can lead to partial or complete destruction of the porous carbon lattice, i.e. the first framework structure.

Preferably the extrudable composition provided in step (a) exhibits the following composition (in percentages by weight):

| resin: | 10–50% | preferably | 11–15% |
|---|---|---|---|
| activated carbon: | 10–50% | preferably | 11–15% |
| chamotte: | 10–50% | preferably | 11–15% |
| glass fibers: | 1–15% | preferably | 1.5–5% |
| silica sol: | 5–50% | preferably | 10–15% |
| cellulose ether: | 1–50% | preferably | 3–4.5% |
| water: | 5–45% | preferably | 18–35% |
| plasticizer: | 0.25–2% | preferably | 1–1.5 % |
| soap: | 0.1–1% | preferably | 0.5–1.0% |

The present invention is illustrated in detail below with reference to examples and the accompanying drawings. The examples serve exclusively to provide further explanation and are not to be regarded as a limitation of the invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
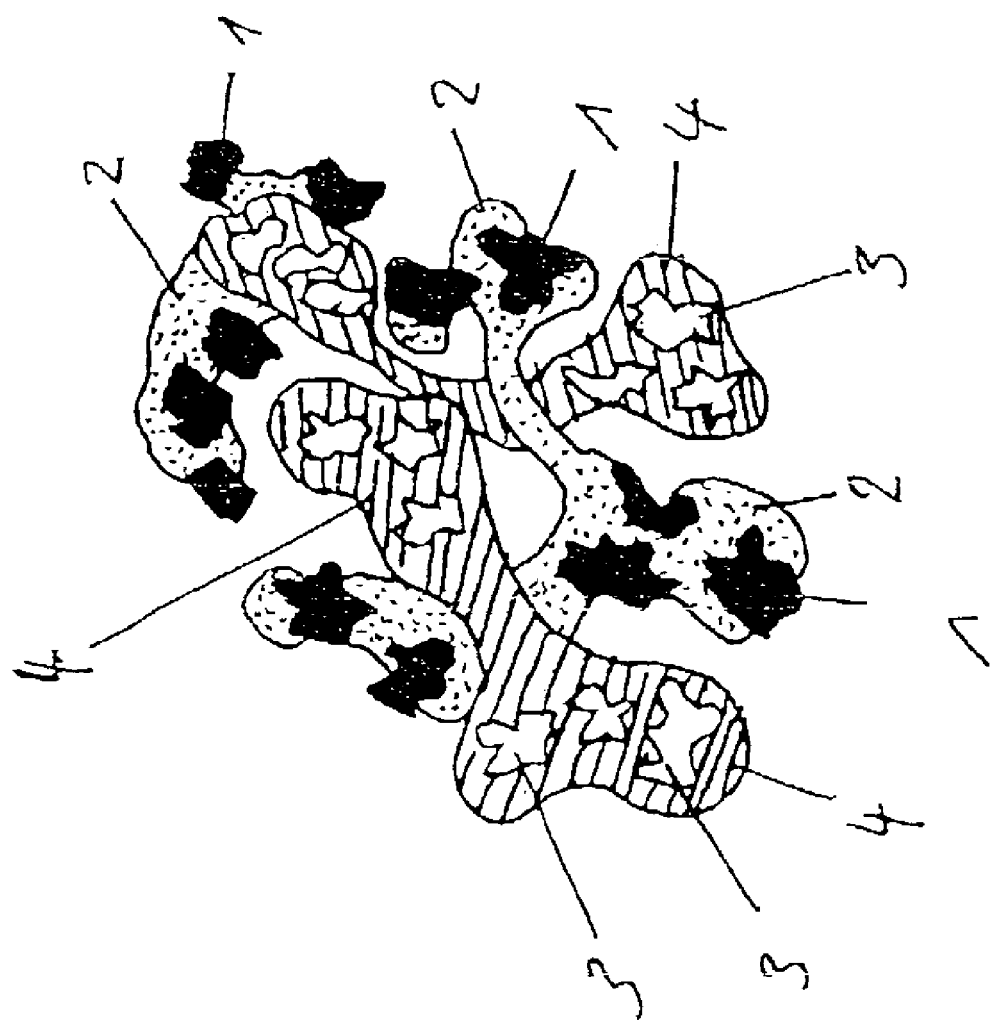
FIG. 1 is a large-scale diagrammatic representation of a section of a mechanically stable, porous shaped activated carbon article of the invention illustrating the mutual penetration of the first and second three-dimensional framework structures.

FIG. 1 is a diagrammatic illustration of the structure of a shaped activated carbon article of the invention shown. The activated carbon particles 1 are embedded in the first three-dimensional framework structure based on carbonized resin 2, the surface of the activated carbon particle 1 being not wholly but only partially enclosed by the three-dimensional framework structure of carbonized resin 2. Thus substantially the entire surface of the activated carbon particles is available for sorption purposes.

The second three-dimensional inorganic framework structure consists of ceramic material and/or refractory material 3 in a SiO2 matrix 4. The SiO2 matrix 4 is formed by the addition of a silicate binder to bind the ceramic material and/or refractory material 3 during production of the shaped activated carbon article of the invention. In the diagrammatic representation of an enlarged section of a shaped activated carbon article of the invention it is clearly visible that the first three-dimensional framework structure comprising activated carbon 1 and carbonized resin 2 and the second three-dimensional inorganic framework structure of ceramic material bonded by the SiO2 matrix 4 and/or baked refractory material 3 penetrate each other, i.e. are interlocked.

By reason of the three-dimensional interlocking of the two framework structures and fixation of the activated carbon particles in position in the porous carbon structure produced by carbonization of resinous material, there results a mechanically extremely stable and porous shaped activated carbon article.

Figure 2:
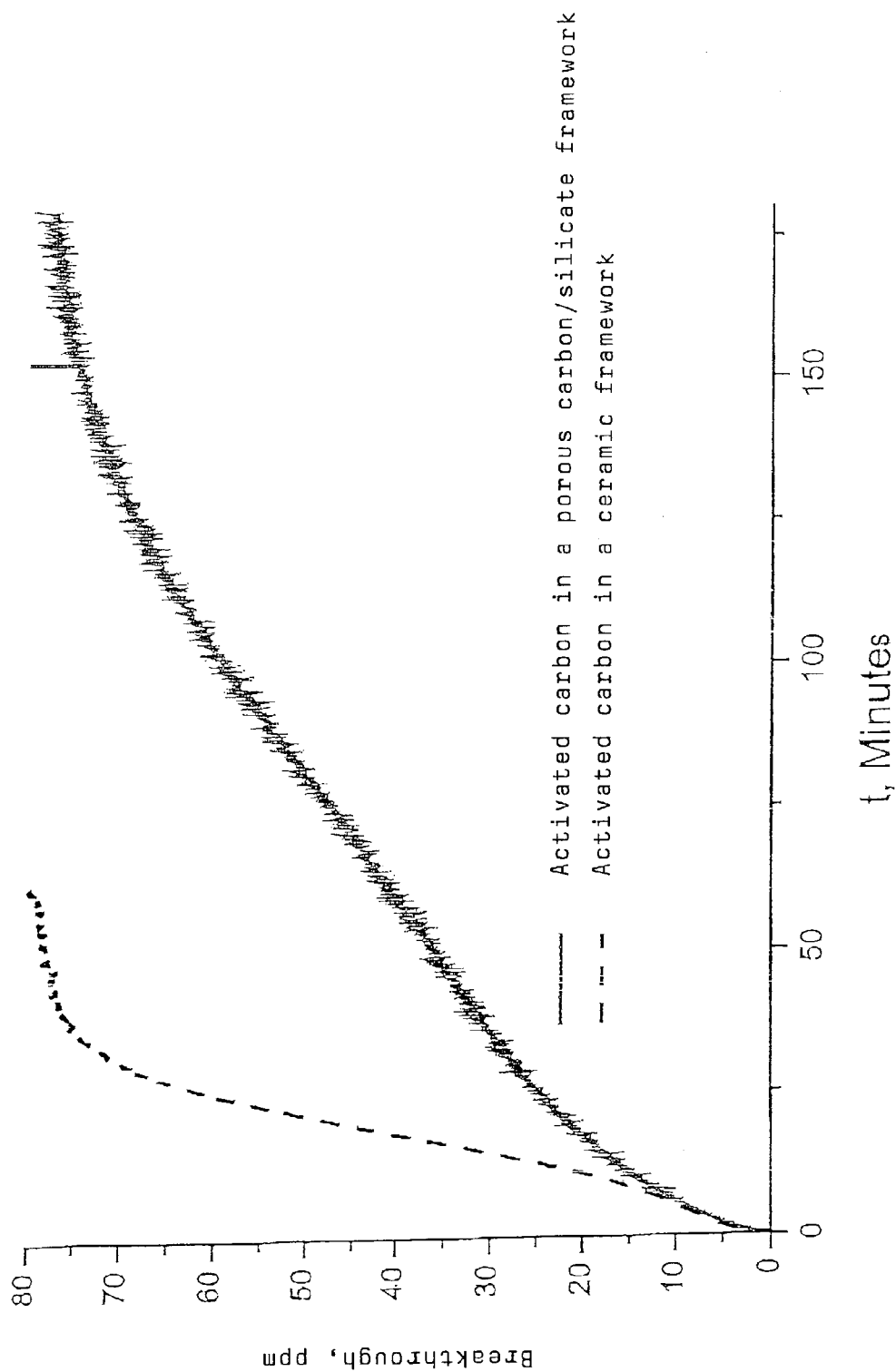
FIG. 2 shows the adsorptability of a shaped activated carbon article of the invention compared with a filter medium of the prior art comprising a ceramics framework containing activated carbon.

FIG. 2 shows an adsorption curve for n-butane of a mechanically stable, porous shaped activated carbon article of the invention, described in detail below, compared with an adsorption filter of identical geometry of the prior art, in which the activated carbon is present in a ceramic lattice. Recording of the curves was carried out for both the shaped activated carbon article of the invention and the comparative filter employing a stream having an in-flow concentration of 80 ppm of n-butanol in air and a volumetric flow rate of 40 L/min at 23° C. and a relative humidity of 10%.

The adsorptability was determined in each case by taking an n-butane breakthrough reading. This was done by determining the n-butane concentration in the emergent volumetric stream as provided by the shaped activated carbon article of the invention and the comparative filter respectively.

The diameter of the circular monolithic shaped activated carbon article and of the comparative filter is 32 mm and their length is 100 mm, whilst their cell content is 200 cpsi (cells per square inch).

As may be seen from FIG. 2, the adsorptability of a mechanically stable, porous shaped activated carbon article of the invention (continuous line) is distinctly greater than that of an adsorption filter consisting of a ceramics framework provided with activated carbon (dashed line).

Figure 3:
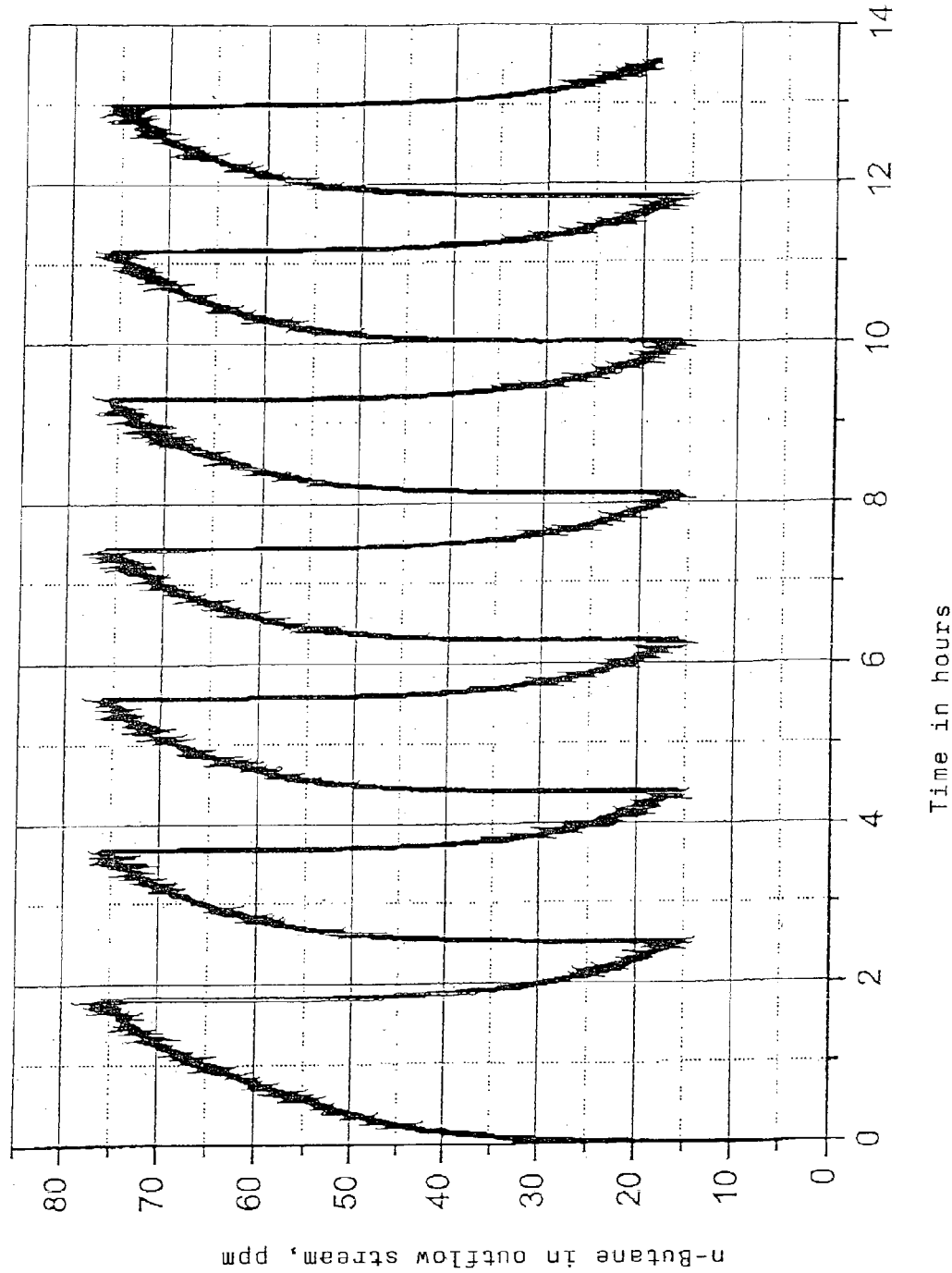
FIG. 3 shows seven adsorption/desorption cycles of the mechanically stable, porous shaped activated carbon article of the invention.

FIG. 3 shows seven adsorption/desorption cycles of the mechanically stable, porous shaped activated carbon article of the invention of which the plot is shown in FIG. 2. For each cycle the shaped activated carbon article of the invention was loaded with n-butane to a degree of saturation of 95% followed by a stream of pure air passed through in the same direction until the concentration downstream of the shaped activated carbon article was 16 ppm (desorption). After only two adsorption/desorption cycles a state of equilibrium is established, in which the amount of n-butane adsorbed during one cycle is totally desorbed in the subsequent desorption cycle. These findings show that the properties of the mesoporous activated carbon used in the filter in this example are fully retained. Mesoporous activated carbon has the property of providing good desorption of previously adsorbed n-butane when flushed with pure air. For this reason it is used for tank ventilation in the automotive industry or, alternatively, for solvent recovery. The filter illustrated in this example is conceived for use in tank ventilation as residual emission filter and must possess the properties of mesoporous activated carbon.

Figure 4:
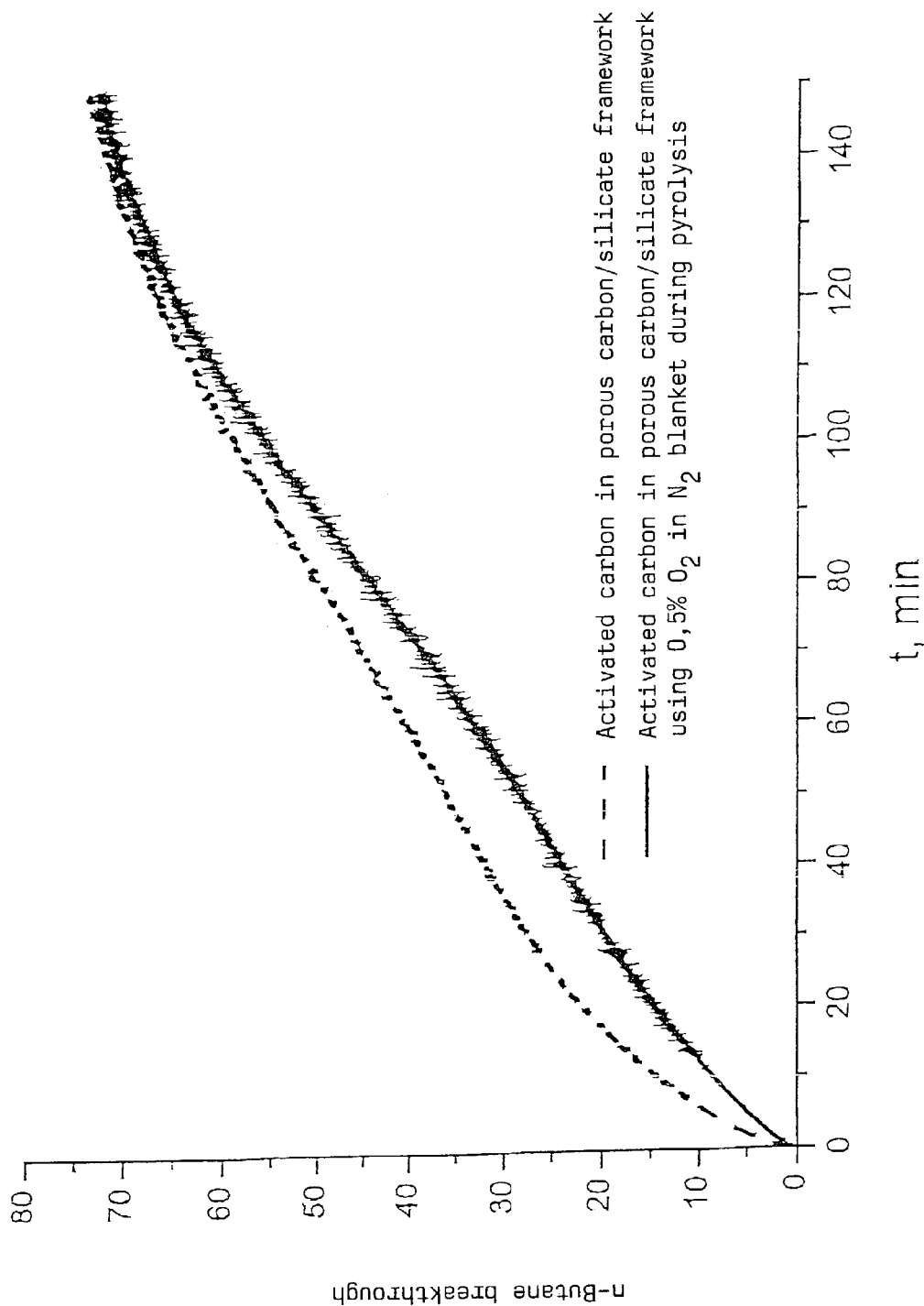
FIG. 4 shows the adsorptability of two different mechanically stable, porous shaped activated carbon articles of the invention.

FIG. 4 shows that the adsorptability of the shaped activated carbon article used for the readings shown in FIGS. 2 and 3 can be distinctly improved if 0.5% of oxygen is present in the protective nitrogen gas during the residence time at the final temperature in the sintering step. The improvement in the breakthrough curve is particularly evident at the beginning of recording, where distinctly better adsorptive dynamics hold.

The dashed line in FIG. 4 shows the breakthrough behavior of a shaped activated carbon article of the invention with respect to n-butane, said article being produced as described below. The continuous line shows the breakthrough curve of a shaped activated carbon article of the invention, during the production of which 0.5% of oxygen was added to the protective nitrogen atmosphere during sintering.

The measurement conditions are identical to the measurement conditions used when plotting the curve shown in FIG. 2.

The readings show that the mechanically stable, porous shaped activated carbon articles of the invention exhibit excellent sorptability and are very suitable for use in filtering systems or adsorption filter systems, particularly for gas purification, preferably the purification of air.

To produce a shaped activated carbon article of the invention, the following components are used in process step (a) and they are mixed until a homogeneous mixture is obtained:

| Constituent | Amount, g |
|---|---|
| activated carbon | 1540 |
| novolak powder | 4620 |
| chamotte | 1540 |
| glass fibers | 160 |
| cellulose ether | 506 |
| silica sol, 30% solid SiO2 | 1400 |
| deionized water | 2550 |
| oleic acid | 250 |
| soap | 120 |

Activated carbon: mesoporous wood charcoal, content of mesopores >50%, surface area (BET) 1800 m2/g.

The above mixture was extruded to give a shaped activated carbon article (step (b)), which was then cut to size:

| | |
|---|---|
| length: | 100 mm |
| diameter: | 32 mm |
| cell content: | 200 cpsi |

The extruded shaped activated carbon article was dried for one hour in a forced air oven at 70° C. (step (c)), heated for one hour at 150° C. (step (d)), then pyrolyzed over a period of two hours at 450° C. (step (e)), and sintered over a period of two hours at 650° C. (step (f)).

On the shaped activated carbon article thus produced readings were taken to give the plots shown in FIGS. from 2 to 4.

For the comparative measurements plotted in FIG. 4, 0.5% of oxygen was added to the blanket of nitrogen during the final temperature period in the sintering step.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A mechanically stable, porous shaped activated carbon article comprising
   a first three-dimensional framework structure comprised of carbonized resin,
   a second three-dimensional inorganic framework structure comprising ceramic material and/or baked refractory material and also binding agent, and activated carbon particles,
   in which the first and second framework structures penetrate each other at least partially and the activated carbon particles are fixed in position.

2. A shaped activated carbon article as defined in claim 1, wherein the first and second framework structure penetrate each other substantially completely.

3. A shaped activated carbon article as defined in claim 1, wherein the activated carbon particles are fixed substantially to the first framework structure.

4. A shaped activated carbon article as defined in claim 1, wherein the first framework structure is substantially comprised of carbonized resin having aromatic nuclei.

5. A shaped activated carbon article as defined in claim 1, wherein the first framework structure is substantially comprised of carbonized synthetic resin.

6. A shaped activated carbon article as defined in claim 5, wherein the synthetic resin is a novolak resin.

7. A shaped activated carbon article as defined in claim 5, wherein said carbonized synthetic resin is selected from the group consisting of phenolic resin, furan resin, epoxy resin, unsaturated polyester resin, or a mixture thereof.

8. A shaped activated carbon article as defined in claim 1, wherein the ratio, by weight, of resin to activated carbon prior to carbonization ranges from approximately 1:1 to approximately 6:1.

9. A shaped activated carbon article as defined in claim 8, wherein the ratio, by weight, of resin to activated carbon prior to carbonization ranges from approximately 2:1 to approximately 4:1.

10. A shaped activated carbon article as defined in claim 1, wherein the binding agent in the second framework structure is a silicate binder.

11. A shaped activated carbon article as defined in claim 10, wherein said silicate binder is colloidal silica sol and/or water glass.

12. A shaped activated carbon article as defined in claim 1, wherein the ceramic material and/or refractory material is a chamotte.

13. A shaped activated carbon article as defined in claim 1, wherein the second framework structure additionally contains a fluxing agent for decreasing the sintering temperature.

14. A shaped activated carbon article as defined in claim 13, wherein the second framework structure contains fluxing agent $Na_2O$ in a concentration of up to approximately 1 wt % based on the total weight of the ceramic material and/or baked refractory material.

15. A shaped activated carbon article as defined in claim 14, wherein the fluxing agent $Na_2O$ is in a concentration from approximately 0.3 to approximately 1 wt % based on the total weight of the ceramic material and/or baked refractory material.

16. A shaped activated carbon article as defined in claim 1 wherein stabilizing fibers are present in the first and/or second framework structure.

17. A shaped activated carbon article as defined in claim 16, wherein said stabilizing fibers are glass fibers and/or carbon fibers.

18. A shaped activated carbon article as defined in claim 1, wherein the shaped activated carbon article has a honeycomb structure.

19. A filtering system, containing a mechanically stable, porous shaped activated carbon article said carbon article comprising:
    a first three-dimensional framework structure comprised of carbonized resin,
    a second three-dimensional inorganic framework structure comprising ceramic material and/or baked refractory material and also binding agent, and activated carbon particles,
    in which the first and second framework structures penetrate each other at least partially and the activated carbon particles are fixed in position.

20. A filtering system as defined in claim 19 wherein the first and second framework structures of the shaped activated carbon article penetrate each other substantially completely.

21. A filtering system as defined in claim 19, wherein the shaped activated carbon particles of the shaped activated carbon article are fixed substantially to the first framework structure.

22. A filtering system as defined in claim 19, wherein the first framework structure of the shaped activated carbon article is substantially comprised of carbonized resin having aromatic nuclei.

23. A filtering system as defined in claim 19, wherein the first framework structure of the shaped activated carbon article is substantially comprised of carbonized synthetic resin.

24. A filtering system as defined in claim 23, wherein the synthetic resin is a novolak resin.

25. A filtering system as defined in claim 23, wherein said carbonized synthetic resin is selected from the group consisting of phenolic resin, furan resin, epoxy resin, unsaturated polyester resin, or a mixture thereof.

26. A filtering system as defined in claim 19, wherein the ratio, by weight, of resin to activated carbon prior to carbonization ranges from approximately 1:1 to approximately 6:1.

27. A filtering system as defined in claim 26, wherein the ratio, by weight, of resin to activated carbon prior to carbonization ranges from approximately 2:1 to approximately 4:1.

28. A filtering system as defined in claim 19, wherein the binding agent in the second framework structure is a silicate binder.

29. A filtering system as defined in claim 28, wherein the silicate binder is colloidal silica sol and/or water glass.

30. A filtering system as defined in claim 19, wherein the ceramic material and/or refractory material is a chamotte.

31. A filtering system as defined in claim 19, wherein the second framework structure of the shaped activated carbon article additionally contains a fluxing agent for decreasing the sintering temperature.

32. A filtering system as defined in claim 31, wherein the second framework structure contains fluxing agent $Na_2O$ in a concentration of up to approximately 1 wt % based on the total weight of the ceramic material and/or baked refractory material.

33. A filtering system as defined in claim 32, wherein the fluxing agent $Na_2O$ is in a concentration from approximately 0.3 to approximately 1 wt % based on the total weight of the ceramic material and/or baked refractory material.

34. A filtering system as defined in claim 19 wherein stabilizing fibers are present in the first and/or second framework structure.

35. A filtering system as defined in claim 34, wherein the stabilizing fibers are glass fibers and/or carbon fibers.

36. A filtering system as defined in claim 19 wherein the shaped activated carbon article has a honeycomb structure.

* * * * *